UNITED STATES PATENT OFFICE.

ISAAC T. THRASH, OF GRIFFIN, GEORGIA, ASSIGNOR OF TWO-THIRDS HIS RIGHT TO JOHN M. WILLIAMS AND DANIEL S. MUSE, OF SAME PLACE.

IMPROVEMENT IN MEDICAL COMPOSITIONS.

Specification forming part of Letters Patent No. 170,918, dated December 7, 1875; application filed September 12, 1874.

*To all whom it may concern:*

Be it known that I, ISAAC T. THRASH, of Griffin, in the county of Spalding and in the State of Georgia, have invented certain new and useful Improvements in Medicinal Compound for the Cure of Pulmonary Diseases; and do hereby declare that the following is a full, clear, and exact description thereof.

The nature of my invention consists of a medicine, the ingredients of which are ground or pulverized buck's horn, water, bark of the root of button-willow, and honey, and Jamaica rum, for the cure of consumption and other pulmonary diseases, as hereinafter more fully set forth.

To make a quart of the medicine I pulverize or rasp the horn of a buck until I obtain four (4) ounces. This is put into a half gallon of water and boiled down to one pint. Then take four (4) ounces of the bark of the root of button-willow, and place it into a half a gallon of water, and boil it down to one pint, and strain it thoroughly. The boiled buck's horn and the boiled root of button-willow are then put together, and to them is added one pint of honey. The compound is then boiled down gently, or simmered to one pint, and then strained through a flannel cloth. After this I add one pint of pure Jamaica rum, and the medicine is ready for use.

I do not wish to confine myself to the exact proportions above set forth. A dose for an adult is about one table-spoonful three times times a day before eating.

Having thus fully described my invention, what I claim as new, and desire to secure by Letters Patent, is—

A composition of matter, consisting of pulverized or rasped buck's horn, water, bark of the root of button-willow, honey, and Jamaica rum mixed together, substantially in the manner and for the purposes set forth.

In testimony that I claim the foregoing I have hereunto set my hand this 8th day of September, 1874.

ISAAC T. THRASH.

Witnesses:
 JOHN E. MOSS,
 W. M. MITCHELL.